United States Patent [19]
Giesfeldt

[11] 3,910,548
[45] Oct. 7, 1975

[54] MEANS FOR MAKING POTATO BASKETS
[75] Inventor: John C. Giesfeldt, Milwaukee, Wis.
[73] Assignee: Baskettes Ltd., Milwaukee, Wis.
[22] Filed: Nov. 27, 1973
[21] Appl. No.: 419,405

Related U.S. Application Data
[62] Division of Ser. No. 144,747, May 19, 1971, Pat. No. 3,800,054.

[52] U.S. Cl. ............... 249/141; 249/160; 426/514
[51] Int. Cl.² .................. A23L 1/216; A47J 43/20
[58] Field of Search ........... 249/141, 113, 154, 160, 249/144; 426/390, 514, 143; 425/84, 412, 420, 812; 220/17, 4 B, 4 F; 99/403, 428

[56] References Cited
UNITED STATES PATENTS
682,515  9/1901  Allard .............................. 249/141
3,680,828  8/1972  Swett .............................. 249/134

Primary Examiner—Francis S. Husar
Assistant Examiner—David S. Safran
Attorney, Agent, or Firm—Thomas F. Kirby

[57] ABSTRACT

A container for making potato baskets or the like comprises an inner shell, an outer shell and a cover member. The inner shell comprises a first conical perforated side wall member, a perforated end wall at the narrow end of the side wall member, and a perforated flange member at the wide end of the side wall member, which flange member extends outwardly therefrom. The outer shell comprises a second conical perforated side wall member of greater length and diameter than the first side member and its wide end is adapted to releasably engage the flange member when the two shells are nested together. An opening at the narrow end of the second side wall member is adapted to be closed by a cover member which releasably engages the second side wall member. The first and second side wall members have different angular slopes so that the space enclosed therebetween is wider at the narrower end of the container than at the other end to facilitate the insertion of a raw shredded comestible and to facilitate the removal of the cooked basket.

Several assembled and filled containers can be stacked together and releasably secured by brackets, with the flange member of one container closing off the opening in the narrow end of an adjacent container.

In accordance with the method, a raw shredded comestible is inserted into the space through the opening in the narrow end of an assembled container and packed firmly in place. Then, the cover is put in place (or several containers are stacked together and releasably secured by the brackets) and the filled, closed container is immersed in hot frying liquid until the comestible is cooked. Then, the container is removed from the liquid and the inner and outer shells are separated to release the cooked basket.

12 Claims, 7 Drawing Figures

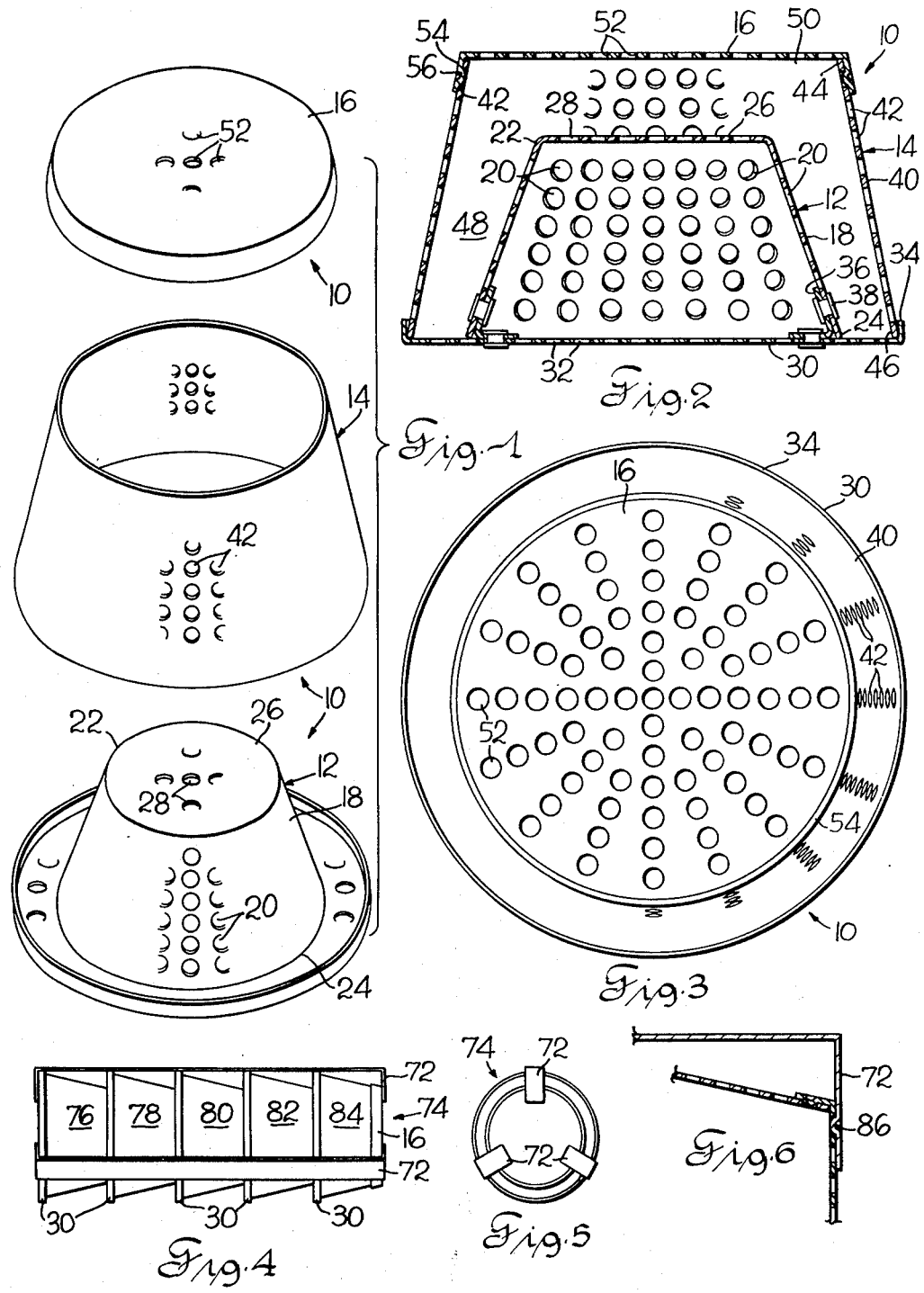

MEANS FOR MAKING POTATO BASKETS

Reference to Related Co-Pending Application

This application is a divisional of my co-pending U.S. patent application Ser. No. 144,747 filed May 19, 1971, entitled "Method for Making Potato Baskets," allowed Oct. 29, 1973, now pat. No. 3,800,054.

BACKGROUND OF THE INVENTION

1. Field of Use of the Invention

This invention relates generally to means and methods for making basket-shaped comestibles, such as potato baskets or the like.

2. Description of the Prior Art

Heretofore, individual so-called "potato baskets" were made by providing a first member similar in shape to an ordinary kitchen sieve, partially filling this first member with a raw, shredded food product manually or mechanically arranged in layer about the inner surface, placing and securing a second smaller sieve-like member inside the first one to shape the potatoes in the form of a basket, immersing the entire unit in hot frying liquid until the potatoes were partially cooked, then removing and disengaging the two sieve-like members to release the partially cooked potato basket, and continuing to fry the basket until done. Examples of the prior art are shown in U.S. Pat. Nos. 2,156,145 and 2,833,654.

The prior art means and methods, while generally satisfactory for their intended purpose, required considerable time to manually or mechanically arrange the shredded potatoes properly so that the two sieve-like members could be fitted together prior to cooking. Also, in the manual way, skilled personnel were required. Furthermore, the prior art only contemplated the use of individual containers during the cooking process. It is desirable, therefore, to provide improved means and methods for making potato baskets and the like.

SUMMARY OF THE INVENTION

In accordance with the present invention, there is provided a container for making potato baskets or the like which comprises an inner shell, an outer shell and cover means. The inner shell comprises a first perforated side wall member having a narrow end and a wide end; a perforated end wall at the narrow end of the first side wall member; and a perforated flange member at the wide end of the first side wall member and extending outwardly therefrom. The outer shell comprises a second perforated side wall member having a narrow end and a wide end. The second side wall member is of greater length and diameter than the first side wall member so that the latter can nest within the former and define a space therbetween. The side wall members have different slopes so that the space therebetween is wider at the narrower ends of the side walls than at the wider ends of the side walls. Means are provided to releasably attach the inner shell to the outer shell.

In accordance with one aspect of the invention, the cover means for closing off the opening in the narrow end of the second side wall member comprises a perforated releasably attachable cover member. In accordance with another aspect of the invention several containers are stacked together and the cover means comprise the outer side of the perforated flange member of an adjacent container.

In accordance with the method of the present invention, the inner shell (comprising the first side wall member and the flange member) and the outer shell (comprising the second side wall member) are secured together. A raw shredded food product is introduced through the opening in the narrow end of the outer shell and manually or mechanically packed in place in the space between side wall members and against the end wall of the inner shell. Then, the opening is closed by manually or mechanically putting the cover means in place (either by emplacement of the cover member or stacking a plurality of containers together). Then, the filled individual container or stack of several filled containers is immersed in a frying liquid, such as hot oil, until the food is cooked. Finally, the container or stack thereof is removed from the liquid and the inner and outer shells are manually or mechanically separated to free the cooked food baskets. Preparatory to reuse, the cover means on individual containers are removed to provide access to the opening in the outer shell.

OBJECTS OF THE INVENTION

It is an object of the present invention to provide improved means and improved methods for making edible basket-shaped food products, such as potato baskets or the like.

Another object is to provide such means and methods which increase the production rate of making such baskets, reduce the cost thereof, provide a more uniform and attractive food product, and provide a less fragile product.

Another object is to provide means and methods of the aforesaid character which permit such baskets to be made by unskilled labor or by mechanized processes.

Another object is to provide improved containers of the aforesaid character which are usable as individual units or in stacked arrangements.

Another object is to provide means of the aforesaid character which are relatively easy and economical to fabricate and use.

Other objects and advantages of the invention will hereinafter appear.

BRIEF DESCRIPTION OF THE DRAWINGS

FIG. 1 is an exploded view of a container for making potato baskets in accordance with the invention;

FIG. 2 is a cross-section view of the assembled container shown in FIG. 1;

FIG. 3 is a top plan view of the assembled container shown in FIG. 2;

FIG. 4 is a side elevational view showing a plurality of containers stacked together and secured by brackets;

FIG. 5 is an end elevational view of the stack of containers shown in FIG. 4;

FIG. 6 is an enlarged cross-section view showing the means whereby the brackets shown in FIGS. 4 and 5 are secured to an end container.

DETAILED DESCRIPTION OF THE EMBODIMENTS

Figure 7:
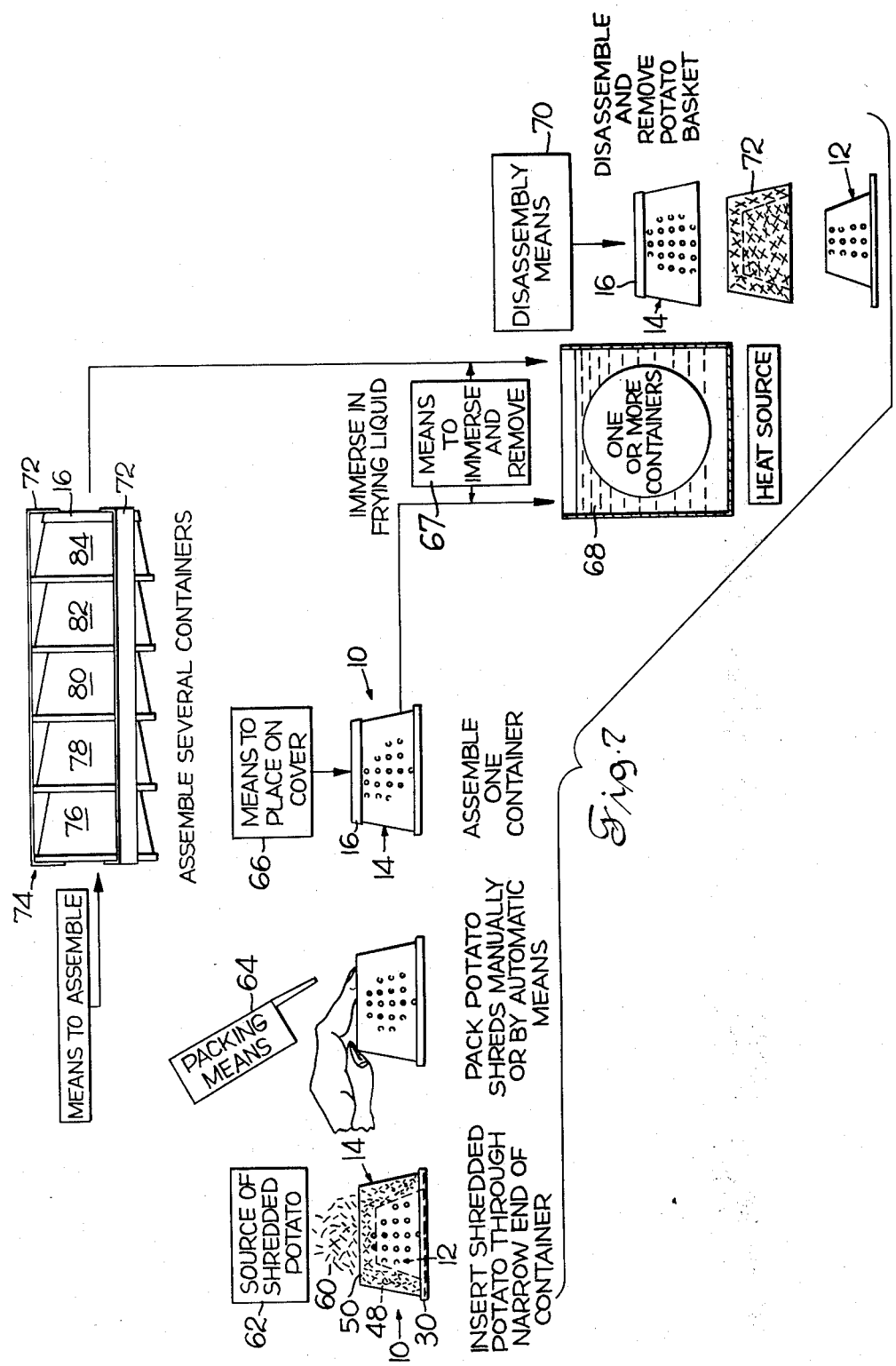
FIG. 7 is diagrammatic showing of a flow chart of method in accordance with the present invention.

Referring to FIGS. 1, 2 and 3 of the drawings, the numeral 10 designates a container for making potato baskets or the like in accordance with the present invention. Container 10 comprises an inner shell 12, an outer shell 14, and cover means which, in FIGS. 1, 2 and 3, comprise a cover member 16.

Inner shell 12 comprises a first side wall member 18 which is provided with a plurality of perforations 20 and has a narrow end 22 and a wide end 24. Preferably, member 18 is frusto-conical or takes the form of a truncated cone, although other shapes with sloped sides could be employed. Inner shell 12 also comprises an end wall 26 at the narrow end 22 of member 18 and the end wall is provided with a plurality of perforations 28. Inner shell 12 further comprises a flange member 30 at the wide end 24 of member 18 and the flange member is provided with a plurality of perforations 32. Flange member 30 extends outwardly beyond the periphery of member 18 and is provided with an annular lip 34. As FIG. 2 best shows, member 18 is rigidly secured to flange member 30 by brackets 36 and rivets 38.

Outer shell 14 comprises a second side wall member 40 which is provided with a plurality of perforations 42 and has a narrow end 44 and a wide end 46. Preferably, member 40 is frusto-conical or takes the form of a truncated cone, although other shapes with sloped sides could be employed. Member 40 is of greater length and greater diameter than member 28 which is adapted to nest therewithin to define a space 48. Members 40 and 18 have different slopes, as FIG. 2 best shows, so that space 48 is wider near narrow end 44 of member 40 than it is near wide end 46 of member 40.

First means are provided for releasably connecting inner shell 12 and outer shell 14 and such means take the form of lip 34 on flange member 30 which frictionally engages the periphery of wide end 46 of member 40.

Cover member 16 for closing an opening 50 at the narrow end 44 of member 40 is provided with a plurality of perforations 52. When cover member 16 is in place, a portion of space 48 exists between cover member 16 and end wall 26 of inner shell 12. Preferably, this portion is about as deep as the widest region of space 48 between the wall members 40 and 18.

Second means are provided for releasably connecting cover 16 to member 40 and such means take the form of lip 54 on cover 26 and, preferably, lip 54 is provided with at least one indentation 56, shown in FIG. 2, which engages a perforation 42 in member 40.

The embodiment of the invention shown in FIGS. 1, 2 and 3 is utilized as follows, as shown in FIG. 7 of the drawings. Inner shell 12 and outer shell 14 are assembled and raw shredded potato 60 from a source 62 is inserted into space 48 through opening 50. Because space 48 is wider near upwardly disposed opening 50 than near the bottom of container 10, the shredded potato 60 is easily inserted and easily packed or tamped into a firm mass, either manually or by mechanical packing or tamping means 64, such as a reciprocating device, shown in FIG. 7. After tamping, cover member 16 is put in place on outer shell 14 either manually or by mechanical means 66, shown in FIG. 7. Then, closed container 10 is immersed in hot frying liquid 68 until the potato is cooked. The perforations in all component parts of container 10 are of such number and size so as to permit free flow of hot liquid to all portions of the potato shreds therein. After cooking, container 10 is removed from liquid 68, either manually or by mechanical means 67. Then, outer shell 14 and inner shell 12 are separated, either manually or by mechanical means 70, to release the finished potato basket 72. Prior to reuse of container 10, cover 16 is removed from outer shell 14 and the latter is again attached to inner shell 12.

FIGS. 4, 5 and 6 of the drawings illustrate another aspect of the present invention wherein a plurality of containers, such as container 10 hereinbefore described, are filled and placed end-to-end in stacked relationship and are releasably secured by means such as one or more bracket members 72 to provide a composite unit 74. In FIG. 4, five containers designated 76, 78, 80, 82 and 84 are shown. It is to be noted that only end container 84 is provided with a cover 16, hereinbefore described. The cover means for the other four containers are provided by the outer sides of the flange members 30 of adjacent containers. As FIG. 6 shows, each bracket member 72 is provided at its opposite ends with one or more projections, such as projection 86, which engage perforations in the containers at the extreme ends of the stack. It is to be understood that in container 76 the perforations so used are in flange member 30 and in container 84 are in cover 16.

The embodiment of the invention shown in FIGS. 4, 5 and 6 is utilized as follows, as shown in FIG. 7 of the drawings. Each container 76, 78, 80, 82 and 84 is assembled by connecting its members 30 and 40 and is filled with shredded potato and tamped, as hereinbefore explained. Then, the containers are stacked end-to-end and end container 84 is provided with a cover 16. Then bracket members 72 are put in place to hold the stack together. Composite unit 74 is then immersed either manually or by suitable mechanical conveying means in the frying liquid 68 until the potato baskets are cooked, usually about 5 minutes. Finally, unit 74 is removed from the liquid, either manually or by suitable mechanical conveying means, disassembled, and the potato baskets removed.

It is to be noted that the configuration of space 48 is such that filling of the containers with raw shredded potato is facilitated and removal of the cooked product is also quite easy with little or no damage to the finished product resulting. Also, the finished potato basket itself is mechanically stronger than known types and is more impervious to liquids served therein.

In the embodiments of the invention disclosed herein the perforations in the various members are shown as circular. However, it is to be understood that the perforations could have other shapes, they are sufficiently large and sufficiently numerous to permit free flow of cooking liquid to all surfaces of the potato basket during cooking. Furthermore, the perforations should be so dimensioned with respect to the size of the potato shreds so that there is no tendency for the shreds to wedge or catch in the perforations. In an actual embodiment, for example, where potato shreds measuring one-eighth inch to three-sixteenth inch on a side were used, it was found desirable to use circular perforations five thirty-seconds inch in diameter and the potato shreds did not catch in the perforations or block liquid flow when packed in place.

I claim:

1. A container for receiving and molding raw shredded potatoes into the form of potato baskets or the like and wherein the molded shredded potatoes are deep fried comprising:

an inner shell comprising a first perforated side wall member having a narrow upper end and a wide lower end,
a perforated end wall at the narrow upper end of said first side wall member,
an outer shell comprising a second perforated side wall member having a narrow upper end and a wide lower end,
the second side wall member being of greater length and greater diameter than said first side wall member so that the inner shell can be releasably nested within the outer shell and define a space between the side walls and between said end wall and said cover means,
said side walls being dimensioned so that the space therebetween is wider at the narrow upper ends of said side walls than at the wider lower ends thereof, said second side wall member defining an opening at the upper end of said outer shell through which raw shredded potatoes can be inserted into said space, said opening being of substantially the same diameter as that of the space between said end wall and said cover means,
a perforated plate member at and extending between the wide lower ends of said first and second side wall members for closing off the lower end of said space,
first means for releasably nesting said inner shell within said outer shell,
perforated removable cover means for closing said opening at the narrow upper end of said outer shell,
and second means for releasably connecting said cover means to said second side wall member.

2. A container according to claim 1 wherein said side wall members are in the form of truncated cones having different slopes.

3. A container according to claim 1 wherein said flange member covers the wide end of the first side wall member.

4. A container according to claim 1 wherein said first means for releasably connecting the wide end of said second side wall member to said flange member comprises an annular lip on said flange member which frictionally engages the periphery of the wide end of said second side wall member.

5. A container according to claim 4 wherein said second means for releasably connecting said cover means to said second side wall member comprises an annular lip on said cover means which frictionally engages the periphery of the narrow end of said second side wall member.

6. A container according to claim 5 wherein said second means further comprises at least one indentation on said lip of said cover means which engages a perforation in said second side wall member.

7. A container for receiving and molding raw shredded potatoes into the form of edible potato baskets and wherein the molded shredded potatoes are deep fried comprising:
a perforated outer shell having an opening at its upper end,
a perforated inner shell of smaller diameter and shorter length than said outer shell and releasable nestable within said outer shell and cooperating therewith to define a cavity comprising an annular space between the sides of said shells and another space between the upper end of said inner shell and said opening, said annular space being wider at the upper end thereof than at the lower end thereof and said other space being of substantially the same diameter as said opening,
means for releasably maintaining siad inner and outer shells in nested relationship,
perforated plate means extending between the lower ends of said inner and outer shells for closing the lower end of said annular space,
and releasable perforated cover means on said container for closing said opening after said cavity is filled with shredded potatoes and during deep frying.

8. A container according to claim 7 wherein said outer shell has an inner side surface defining a conic section and wherein said inner shell has an outer side surface defining a conic section.

9. A container according to claim 8 wherein said inner shell comprises a perforated end wall at its narrower upper end.

10. A container for receiving and molding raw shredded potatoes into the form of edible potato baskets and wherein the molded shredded potatoes are deep fried comprising:
an outer shell comprising a first perforated side wall member defining an opening at its upper end for receiving said raw shredded potatoes,
an inner shell comprising a second perforated side wall member and a perforated end wall at the upper end of said second side wall member,
said second side wall member of said inner shell being of smaller diameter and shorter length than said first side wall member of said outer shell and being releasable nestable within said first side wall member in cooperable relationship therewith so as to define a cavity for receiving the shredded potatoes, said cavity comprising a first space between said side wall members and a second space between said end wall of said inner shell and the upper edge of said first side wall member, said second space being of substantially the same diameter as said opening.
said side wall members having relatively different slopes so that said first space is wider at the upper end thereof nearest said opening than at the lower end thereof,
means for releasably maintaining said shells in nested relationship,
perforated plate means extending between the lower ends of said inner and outer shells for closing the lower end of said first space when said shells are nested,
and removable cover means for closing said opening when said shells are nested and said cavity is filled.

11. A container according to claim 10 wherein said outer shell has an inner side surface defining a conic section and wherein said inner shell has an outer side surface defining a conic section.

12. A container according to claim 11 wherein said inner shell comprises a perforated end wall at its narrower upper end.

* * * * *